Figure 1:
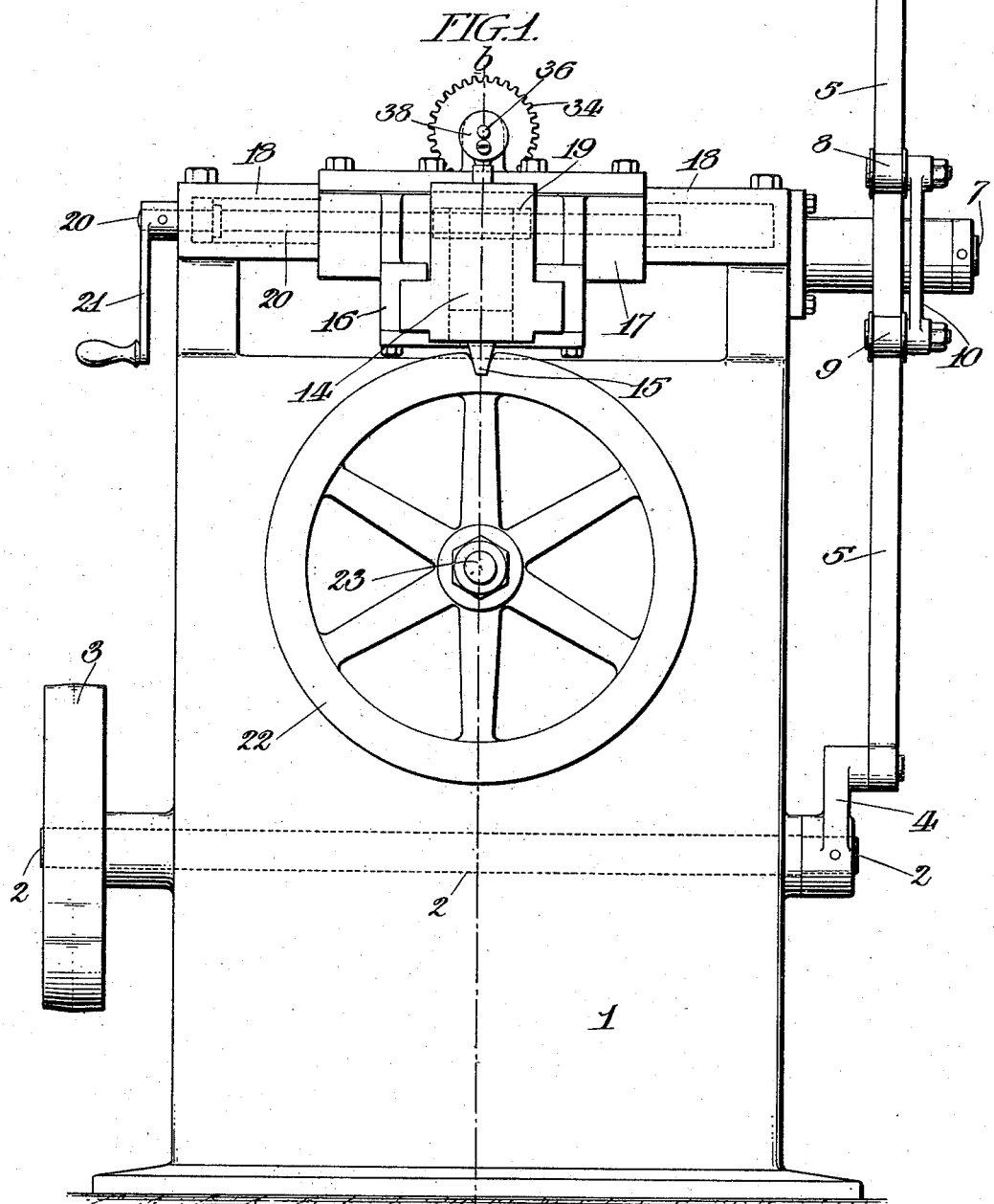

No. 749,606. PATENTED JAN. 12, 1904.
H. BILGRAM.
GEAR CUTTING MACHINE.
APPLICATION FILED DEC. 19, 1902.
NO MODEL. 6 SHEETS—SHEET 2.

Witnesses:
Henry R. Johnson
Max Uhlmann

Inventor:
Hugo Bilgram

No. 749,606. PATENTED JAN. 12, 1904.
H. BILGRAM.
GEAR CUTTING MACHINE.
APPLICATION FILED DEC. 19, 1902.
NO MODEL. 6 SHEETS—SHEET 3.

Witnesses:
Henry R. Johnson
Max Uhlmann

Inventor:
Hugo Bilgram

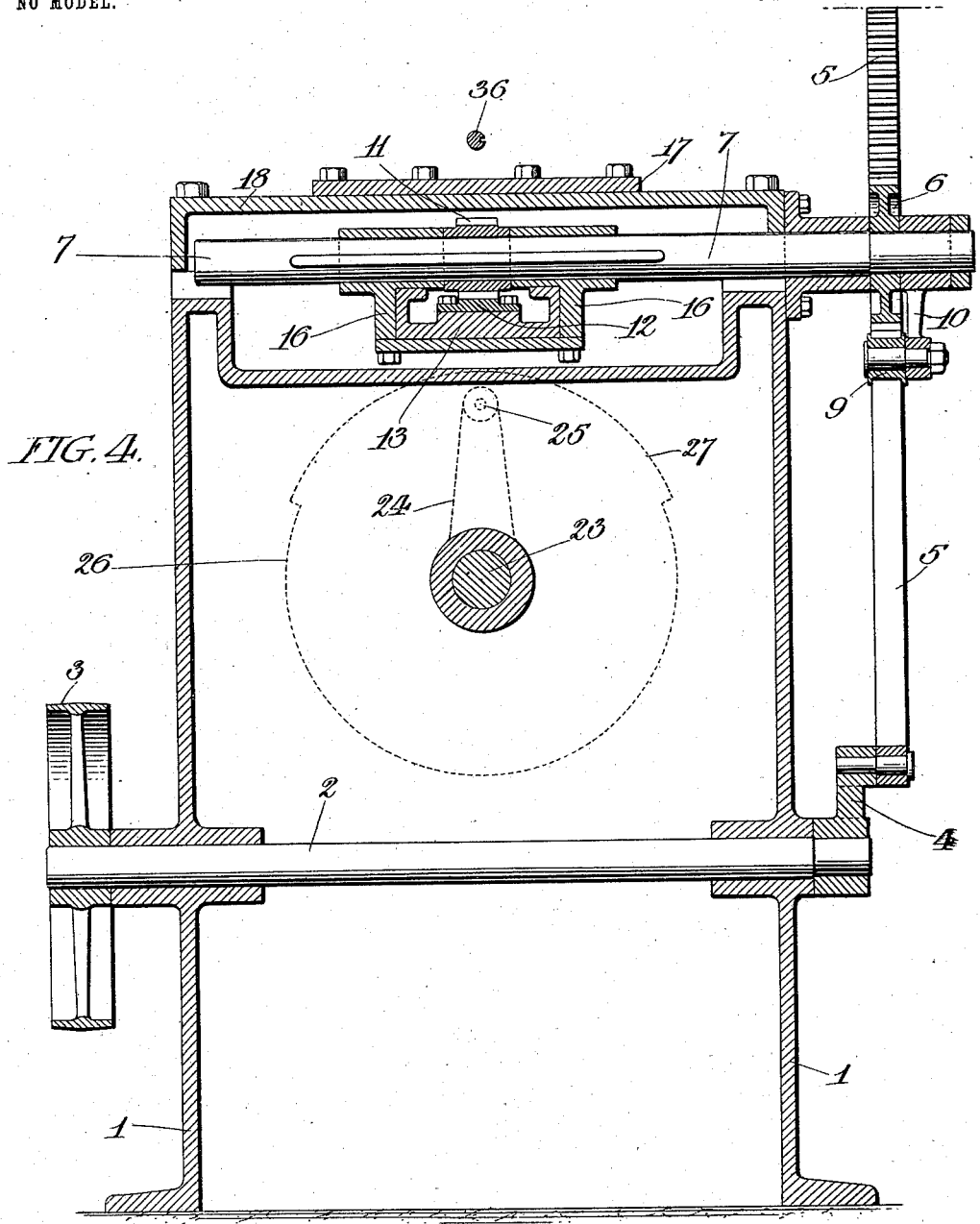

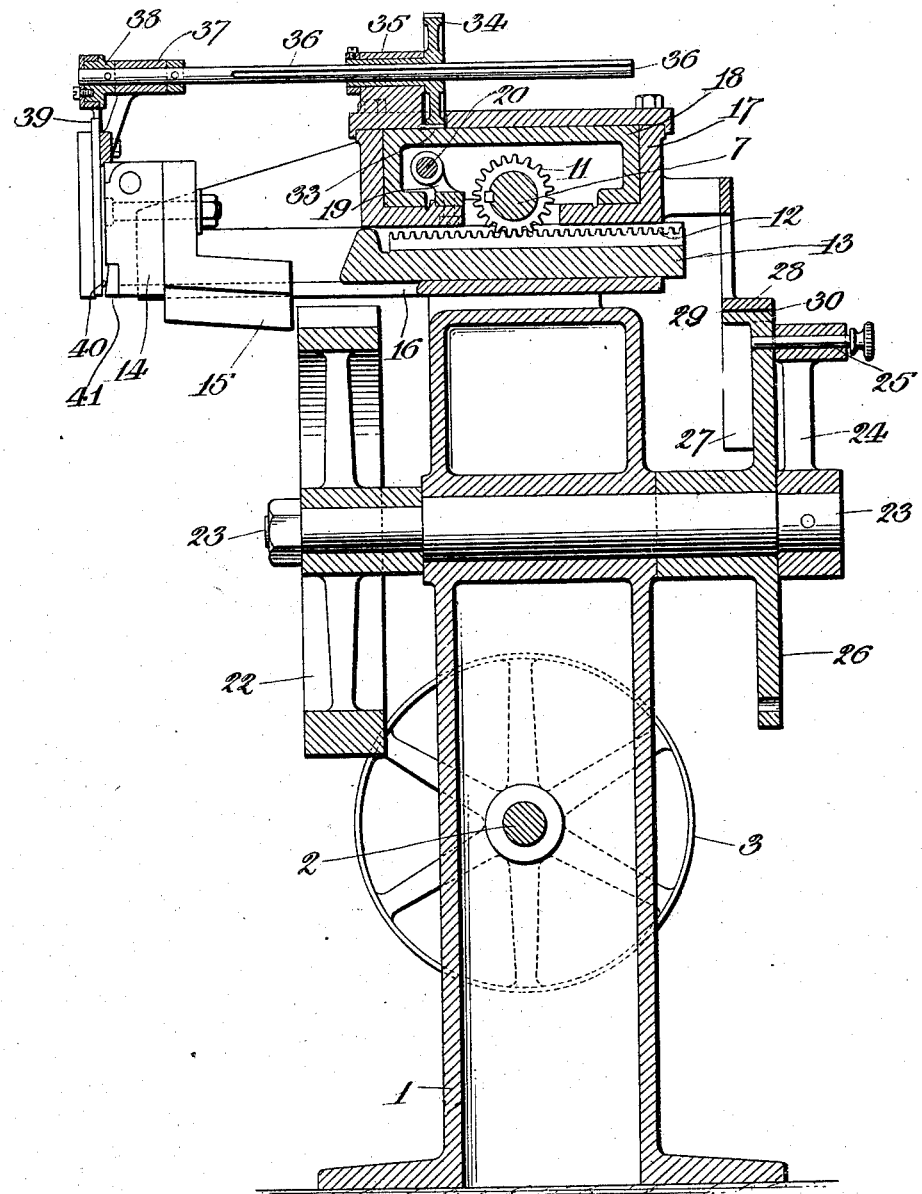

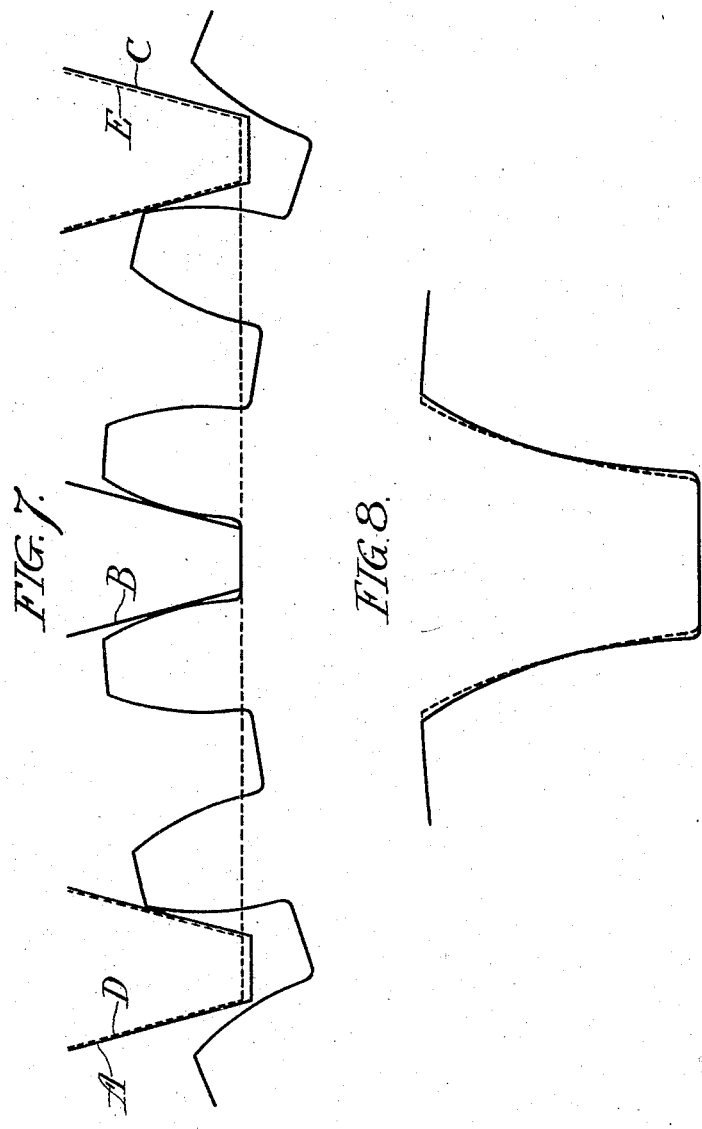

No. 749,606. Patented January 12, 1904.

UNITED STATES PATENT OFFICE.

HUGO BILGRAM, OF PHILADELPHIA, PENNSYLVANIA.

GEAR-CUTTING MACHINE.

SPECIFICATION forming part of Letters Patent No. 749,606, dated January 12, 1904.

Application filed December 19, 1902. Serial No. 135,894. (No model.)

*To all whom it may concern:*

Be it known that I, HUGO BILGRAM, a citizen of the United States, residing at Philadelphia, in the county of Philadelphia and State of Pennsylvania, have invented a new and useful Improvement in Gear-Cutting Machines, of which the following is a specification.

It is now well known in the arts that a theoretically-correct tooth form in spur-gears can be obtained by means of a tool having the shape of the tooth of a rack pertaining to a change-gear system by so moving it in relation to the blank in the process of cutting as a rack engaging with the said spur-wheel when finished would move. It has, however, been found that spur-gears so made produce a humming noise when running at high speed. This may be accounted for as follows: The teeth of wheels when properly constructed are made so that one pair of teeth make contact before the exit of the preceding pair and for a sensible space of time two pairs of teeth remain in simultaneous contact. When the teeth are formed theoretically correct, the pressure to be transmitted will be uniformly shared between the two points of contact while two pairs are in contact and upon the exit of the receding pair will suddenly fall upon the one pair still remaining in contact. As the succeeding pair come into contact the pressure is again suddenly divided between two points of contact. This sudden change of pressure, and especially the fact that the entering tooth will be expected to instantaneously take one-half of the full pressure, readily accounts for the series of shocks manifesting themselves in the humming noise. This noise may be materially reduced if the teeth are so formed that each tooth upon coming into contact with its mate shall at first take only a small fraction of the pressure to be transmitted and that as the movement proceeds the pressure upon the approaching pair shall be gradually increased while that of the receding pair is correspondingly reduced, so that the pressure shall be transferred gradually instead of suddenly from one tooth to the following one. This can be attained by slightly relieving either at the point or near the base, or both, the surface of the otherwise-correctly-formed tooth. When a pair of teeth come in contact, it is the base of the flank of the driving-tooth that comes in contact with the point of the face of the driven tooth. It would therefore be immaterial whether the point of the face or the base of the flank were relieved; but I think it is preferable to relieve both.

A machine by means of which my invention can be carried into practice is illustrated in the accompanying drawings, in which—

Figure 2:
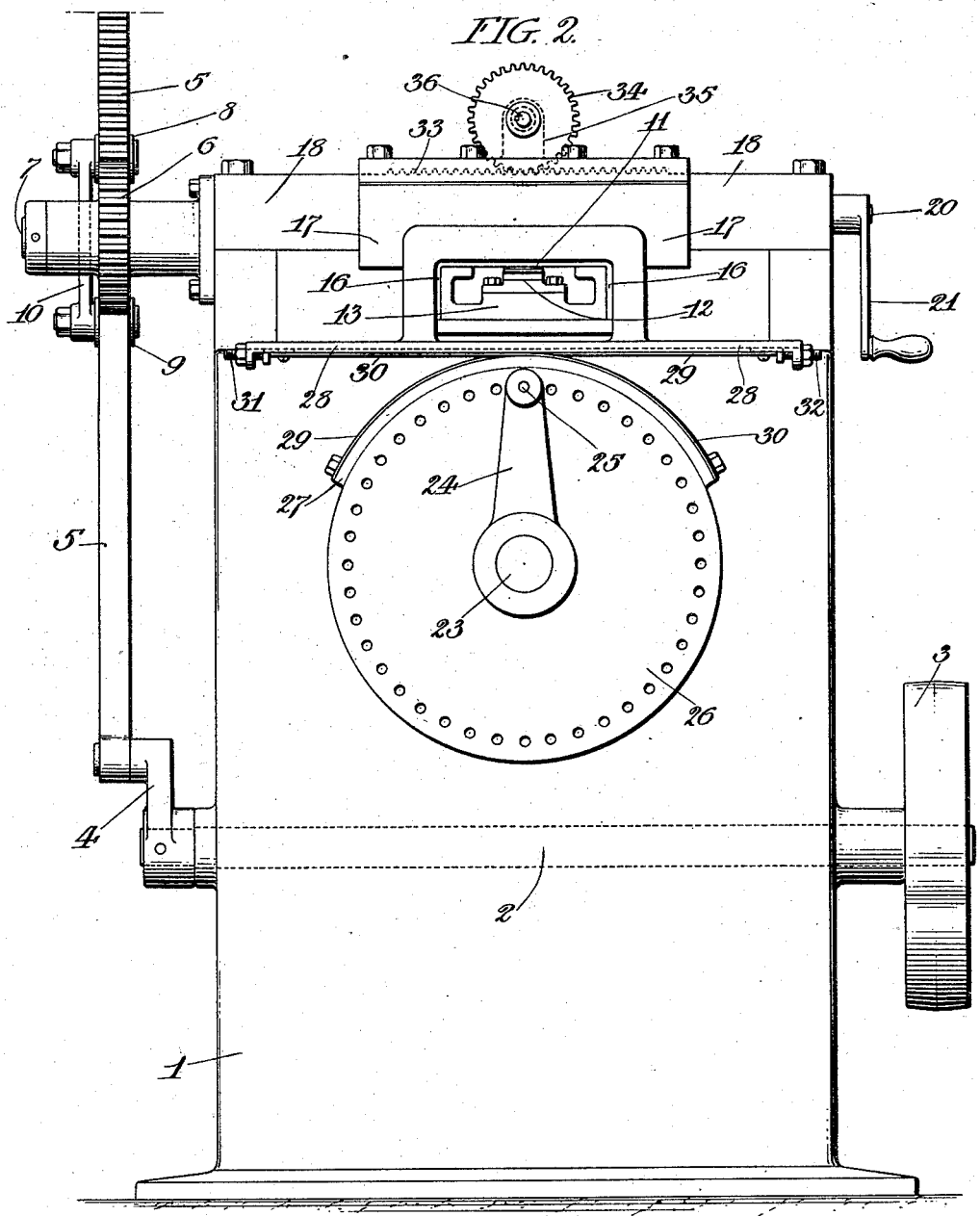
Figure 6:
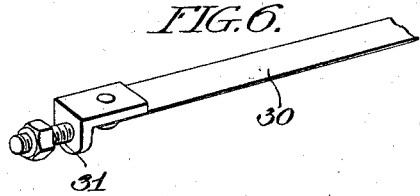
Figure 3:
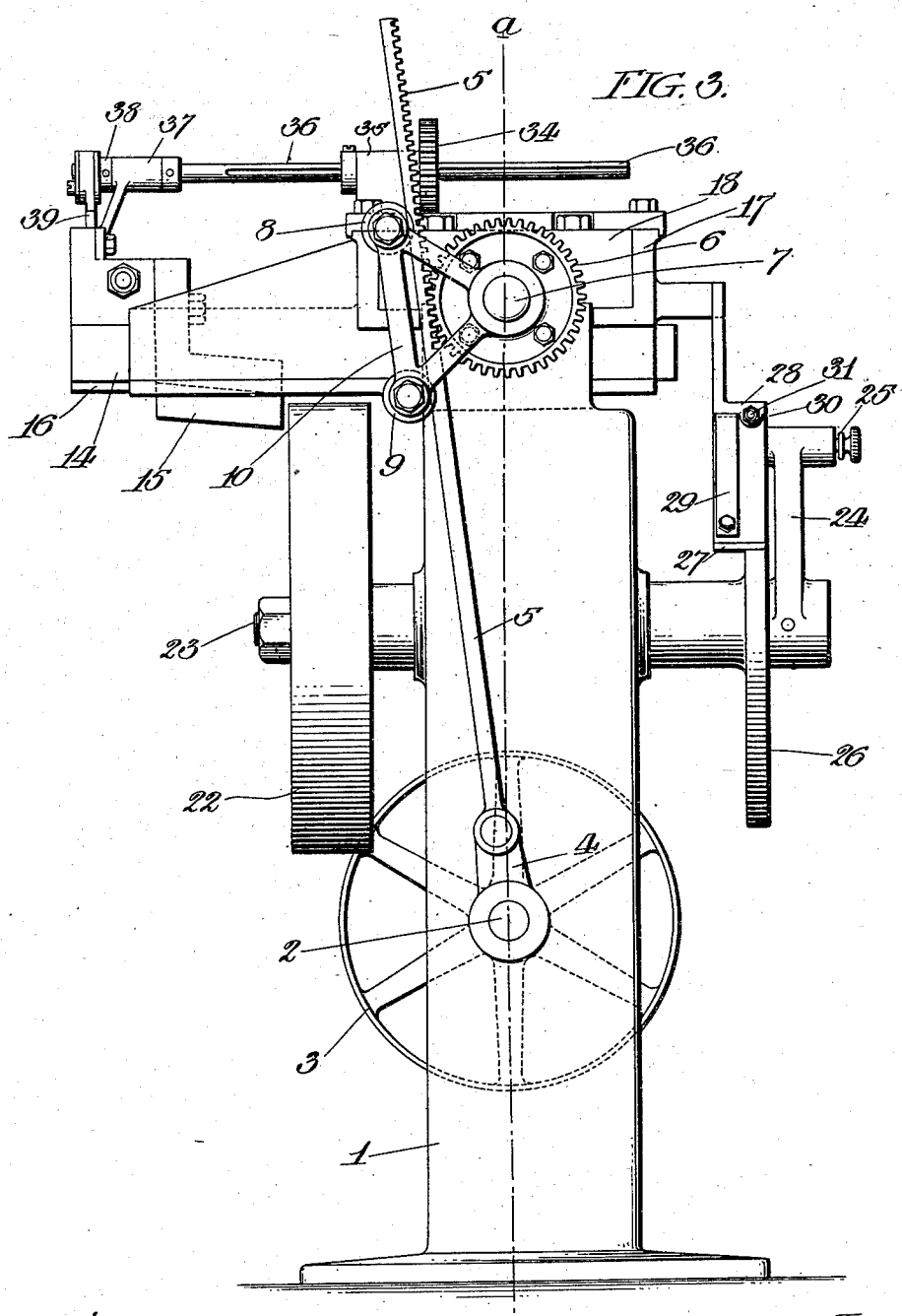

Figure 1 is a front view of the machine; Fig. 2, a rear view; Fig. 3, a side view from the right side, Fig. 1. Fig. 4 is a section on line $a\ a$, Fig. 3. Fig. 5 is a section on line $b\ b$ of Fig. 1. Fig. 6 shows the band-clamp detached. Fig. 7 is a diagram showing the relative movement of the tool and the wheel in the process of cutting. Fig. 8 is a drawing of a tooth-space, with and without the rounding off, shown very much exaggerated.

Ordinarily the tool is made to traverse in a straight line passing through the positions D, B, and E, Fig. 7, the first and last being shown in dotted lines.

In my new machine the tool is given a slightly-curved transverse motion, the real positions of the tool at A and C being lower than the positions D and E, due to a rectilinear motion. The effect of the curved transverse motion of the tool is a modification of the tooth form as shown in Fig. 8, in which the dotted lines represent the theoretically-correct and the full lines the modified form of the teeth, the difference being exaggerated for better illustration.

In the body 1 of the machine is held the main driving-shaft 2, which is provided with the driving-pulley 3 and the crank 4. To the said crank is hinged the rack 5, engaging with the spur-wheel 6, which is secured to the rock-shaft 7. The rack is held in gear by means of two rollers 8 and 9, supported by the brace 10, which freely hinges on the end of the rock-shaft 7. To the rock-shaft 7 is secured by feather the pinion 11, free to move longitudinally on the said rock-shaft and engaging with the rack 12, bolted to the ram 13. Near the end of this ram is the tool-apron 14, which carries the tool 15. The latter has the shape of the tooth of an involute rack, as B in Fig. 7 and as shown in Fig. 1. The bed 16 of the ram is formed in part by the slide 17, fitted to the cross-bar 18, which is bolted to the body 1 of the machine. To the slide 17 is secured the feed-nut 19, engaging with the feed-screw 20, by means of which a lateral motion can be imparted to the tool. The feed-screw 20 carries the hand-crank 21.

The wheel-blank 22 to be cut is secured to the arbor 23, which carries the arm 24, in the end of which is inserted the spacing-pin 25. The spacing-plate 26 is free to rotate on the blank-arbor 23 and is provided with spacing-holes corresponding to the number of teeth to be cut into the wheel-blank and registering with the spacing-pin 25, by means of which the said spacing-plate can be coupled to the blank-arbor 23. The said spacing-plate 26 carries the cylindrical arc 27, the outside surface of which corresponds with the pitch-circle of the wheel-blank 22. To the slide 17 is attached the horizontal bar 28, practically tangent to the arc 27. Two steel bands are stretched between the said bar 28 and the arc 27, as follows: The band 29 is attached by one end to one end of the horizontal bar 28 and by the other to one end of the arc 27. The second band 30 is stretched similarly, but in the opposite direction. For the purpose of giving these bands the proper tension each of them is provided with a threaded clamp 31 and 32, the details of which are shown detached in Fig. 6. These bands connect the arc 27 and the horizontal bar 28 in such a manner that a lateral motion of the said bar will produce a corresponding rotary motion of the arc. A lateral motion of the tool is accordingly attended by a corresponding rotary motion of the wheel-blank 22.

The cross-bar 18 is provided with a rack 33, which engages with the spur-wheel 34. The latter is journaled in the bearing 35, forming part of the slide 17. Through the center of the spur-wheel 34, the bore of which is provided with a feather, passes the splined rod 36, the outer end of which is journaled in the bearing 37, the latter being secured to the front end of the ram 13. At its front end the rod 36 carries the eccentric 38, embraced by the eccentric strap and rod 39, which extends downward in the rear of the apron 14. On its lower end the said eccentric-rod is provided with a projecting knob 40, Fig. 5, against which the apron 14 rests. Opposite this knob the apron carries a steel plate 41, the rear face of which is at an angle, so that if the said eccentric-rod 39 is raised the knob 40 will strike the said steel plate 41 at a higher point and permit the apron 14 to drop lower than before, and the tool will assume a correspondingly-lower position. The eccentric 38 is so adjusted that it will occupy its lowest position when the slide 17 is in its central position, and the tool 15 is accordingly vertically above the center of the blank-shaft 23.

The operation of the machine is as follows: The blank 22 to be cut is secured to the arbor 23, and the slide 17 is moved so far to one side that the tool 15 will just clear the circumference of the blank 22. The main shaft 2 being set in motion, the crank 4 will actuate the rack 5 and put the rock-shaft 7 in motion. The pinion 11 will then transmit a reciprocating motion to the ram 13 and the tool 15. If now the feed-screw 20 is slowly turned, the tool 15 will be fed into the stock of the blank and will begin cutting. It will be noticed now that as the tool moves laterally the blank assumes a rotary movement proportioned to the lateral progress of the tool 15, for the horizontal bar 28 will participate in the lateral movement of the tool and through the steel bands 29 and 30 will transmit a rotary movement to the arc 27, which is coupled to the blank-arbor 23 by means of the spacing-pin 25 and the spacing-plate 26. The relative movement between the tool 15 and the blank 22 will therefore be precisely the same as that of a rack engaging with a spur-wheel, and the tool will consequently cut a space out of the blank-wheel, which will correctly engage with a rack-tooth of the form of the tool 15; but owing to the operation of the rack 33, the spur-wheel 34, the rod 36, and the eccentric 38 the apron will sink lower at the beginning of the operation than it will as the tool approaches its central position and will again sink lower as it passes this central position. The tool instead of moving in a straight horizontal line will actually move in a slightly-curved line, occupying the highest position when it is in its central position, and will therefore produce the slight rounding beyond the theoretically-correct form shown in Fig. 8.

I claim—

1. The combination in a gear-cutting machine of the type in which the tooth form of spur-wheels is generated by a tool having the form of a rack-tooth and moved in relation to the blank, as a rack-tooth would move when engaging a spur-wheel, of an apron adapted to hold the tool, a movable abutment adapted to support the apron during the cutting action of the tool, by means of which the drop of the tool can be varied, and means, arranged to be operated in unison with the transverse movement of the tool, for adjusting the said movable abutment.

2. In a gear-cutting machine of the type in which the tooth form of spur-wheels is generated by a tool having the form of a rack-tooth and moved, in relation to the blank, as a rack-tooth would move when engaging with a spur-wheel, the combination of an apron adapted to hold the tool, an eccentric adapted to be moved automatically in unison with the transverse movement of the tool, an eccentric-rod forming the abutment for the tool-apron, and an inclined face on the tool-apron located to contact with the abutment on the eccentric-rod to cause a variation in the drop of the tool.

3. In gear-cutting machines of the type in which the tooth form of spur-wheels is generated by a tool having the form of a rack-tooth and moved, in relation to the blank, as a rack-tooth would move when engaging with a spur-wheel, the combination of a rack having a fixed position in relation to the blank arbor bearings, a gear-wheel engaging with the said rack and supported by a journal having a fixed position in relation to the tool-ram bed, a splined rod passing through the center of the said gear-wheel, feathered thereto and journaled in a bearing having a fixed position in relation to the tool-ram, an eccentric secured to the said splined rod, an eccentric-rod forming a movable abutment for the tool-apron and the said apron having an inclined abutment-face, substantially as and for the purpose specified.

HUGO BILGRAM.

Witnesses:
 HENRY R. JOHNSON,
 ISAAC THOMPSON.